United States Patent
Shiva et al.

(10) Patent No.: US 10,669,912 B2
(45) Date of Patent: Jun. 2, 2020

(54) APPARATUS FOR FACILITATING REDUCTANT DECOMPOSITION AND MIXING

(71) Applicant: Cummins IP, Inc., Minneapolis, MN (US)

(72) Inventors: Kirankumar Shiva, Leeds (GB); Ambarish D. Khot, Pune (IN)

(73) Assignee: Cummins IP, Inc., Minneapolis, MN (US)

( * ) Notice: Subject to any disclaimer, the term of this patent is extended or adjusted under 35 U.S.C. 154(b) by 235 days.

(21) Appl. No.: 15/657,941

(22) Filed: Jul. 24, 2017

(65) Prior Publication Data

US 2017/0321584 A1    Nov. 9, 2017

Related U.S. Application Data

(62) Division of application No. 14/372,810, filed as application No. PCT/US2012/022582 on Jan. 25, 2012, now Pat. No. 9,745,879.

(51) Int. Cl.
| | | |
|---|---|---|
| *F01N 3/20* | (2006.01) | |
| *F01N 3/28* | (2006.01) | |
| *F01N 13/08* | (2010.01) | |
| *B01F 5/04* | (2006.01) | |

(Continued)

(52) U.S. Cl.
CPC ............ *F01N 3/208* (2013.01); *B01F 5/0473* (2013.01); *B01F 5/0618* (2013.01); *F01N 3/2066* (2013.01); *F01N 3/28* (2013.01); *F01N 3/2892* (2013.01); *F01N 13/08* (2013.01); *B01F 2005/0091* (2013.01);

(Continued)

(58) Field of Classification Search
CPC ...... F02D 41/029; F01N 9/002; F01N 3/0842; F01N 13/02; F01N 3/035
See application file for complete search history.

(56) References Cited

U.S. PATENT DOCUMENTS

| | | | |
|---|---|---|---|
| 2004/0112883 A1* | 6/2004 | Bowden, Jr. ........... | B23K 9/044 219/137 WM |
| 2004/0237511 A1 | 12/2004 | Ripper et al. | |
| 2005/0172615 A1 | 8/2005 | Mahr | |

(Continued)

FOREIGN PATENT DOCUMENTS

| | | |
|---|---|---|
| DE | 10021166 | 11/2001 |
| FR | 2965011 | 3/2012 |

(Continued)

OTHER PUBLICATIONS

United Kingdom Office Action issued for UK Patent Application No. GB1413056.1, dated Sep. 21, 2017, 5 pages.

(Continued)

*Primary Examiner* — Binh Q Tran
(74) *Attorney, Agent, or Firm* — Foley & Lardner LLP

(57) ABSTRACT

According to one embodiment, an apparatus (50) for mounting to an inner wall (33) of an exhaust tube (32) includes a tube engagement surface (52) and an exhaust engagement surface (54A). The tube engagement surface comprises a convex surface of a constant first radius of curvature about a first axis. The exhaust engagement surface is adjacent the tube engagement surface, and includes a concave surface of a second radius of curvature about a second axis generally perpendicular to the first axis.

16 Claims, 11 Drawing Sheets

(51) Int. Cl.
  *B01F 5/06* (2006.01)
  *B01F 5/00* (2006.01)
(52) U.S. Cl.
  CPC ... *B01F 2005/0636* (2013.01); *F01N 2240/20* (2013.01); *F01N 2610/02* (2013.01); *Y02T 10/24* (2013.01)

(56) References Cited

U.S. PATENT DOCUMENTS

| | | | |
|---|---|---|---|
| 2006/0260104 A1* | 11/2006 | Himi | A44B 19/06 24/403 |
| 2007/0163241 A1 | 7/2007 | Meingast et al. | |
| 2007/0245718 A1 | 10/2007 | Cheng et al. | |
| 2008/0121179 A1 | 5/2008 | Park et al. | |
| 2009/0145119 A1 | 6/2009 | Farrell et al. | |
| 2009/0158717 A1 | 6/2009 | Kimura et al. | |
| 2009/0158722 A1 | 6/2009 | Kojima et al. | |
| 2010/0083641 A1 | 4/2010 | Makartchouk et al. | |
| 2010/0146948 A1 | 6/2010 | Dacosta et al. | |
| 2011/0079003 A1 | 4/2011 | Sun et al. | |
| 2011/0094206 A1 | 4/2011 | Liu et al. | |
| 2011/0194987 A1 | 8/2011 | Hodgson et al. | |
| 2012/0124983 A1 | 5/2012 | Hong | |
| 2013/0097819 A1* | 4/2013 | Kojima | A44B 19/14 24/415 |
| 2016/0083060 A1* | 3/2016 | Kassianoff | B63H 1/32 416/1 |

FOREIGN PATENT DOCUMENTS

| | | |
|---|---|---|
| GB | 2 385 545 | 8/2003 |
| JP | 2009-156077 | 7/2009 |
| JP | 2010-180863 | 8/2010 |

OTHER PUBLICATIONS

International Search Report and Written Opinion for PCT/US2012/022582, dated Oct. 25, 2012, 8 Pages.

* cited by examiner

APPARATUS FOR FACILITATING REDUCTANT DECOMPOSITION AND MIXING

CROSS-REFERENCE TO RELATED APPLICATIONS

The present application is a divisional of U.S. patent application Ser. No. 14/372,810, filed Jul. 17, 2014, which is a national Stage of PCT Patent Application No. PCT/US2012/022582, filed Jan. 25, 2012. The contents of both applications are incorporated herein by reference in their entirety.

FIELD

This invention relates to exhaust systems for internal combustion engines, and more particularly to an apparatus that facilitates decomposition of a reductant for a selective catalytic reduction (SCR) catalyst of an exhaust aftertreatment system.

BACKGROUND

Exhaust aftertreatment systems receive and treat exhaust gas generated from an internal combustion engine. Typical exhaust aftertreatment systems include any of various components configured to reduce the level of harmful exhaust emissions present in the exhaust gas. For example, some exhaust aftertreatment systems for diesel powered internal combustion engines include various components, such as a diesel oxidation catalyst (DOC), particulate matter filter or diesel particulate filter (DPF), and a selective catalytic reduction (SCR) catalyst. In some exhaust aftertreatment systems, exhaust gas first passes through the diesel oxidation catalyst, then passes through the diesel particulate filter, and subsequently passes through the SCR catalyst.

Each of the DOC, DPF, and SCR catalyst components is configured to perform a particular exhaust emissions treatment operation on the exhaust gas passing through the components. Generally, the DOC reduces the amount of carbon monoxide and hydrocarbons present in the exhaust gas via oxidation techniques. The DPF filters harmful diesel particulate matter and soot present in the exhaust gas. Finally, the SCR catalyst reduces the amount of nitrogen oxides ($NO_x$) present in the exhaust gas.

The SCR catalyst is configured to reduce $NO_x$ into less harmful emissions, such as N2 and $H_2O$, in the presence of ammonia ($NH_3$). Because ammonia is not a natural byproduct of the combustion process, it must be artificially introduced into the exhaust gas prior to the exhaust gas entering the SCR catalyst. Typically, ammonia is not directly injected into the exhaust gas due to safety considerations associated with the storage of liquid ammonia. Accordingly, conventional systems are designed to inject a reductant (e.g., a urea-water solution) into the exhaust gas, which is capable of decomposing or evaporating into ammonia in the presence of the exhaust gas. SCR systems typically include a urea source and a urea injector or doser coupled to the source and positioned upstream of the SCR catalyst.

Generally, the decomposition of the urea-water solution into gaseous ammonia occupies three stages. First, urea evaporates or mixes with exhaust gas. Second, the temperature of the exhaust causes a phase change in the urea and decomposition of the urea into isocyanic acid (HNCO) and water. Third, the isocyanic acid reacts with water in a hydrolysis process under specific pressure and temperature concentrations to decompose into ammonia and carbon dioxide ($CO_2$). The ammonia is then introduced at the inlet face of the SCR catalyst, flows through the catalyst, and is consumed in the $NO_x$ reduction process. Any unconsumed ammonia exiting the SCR system can be reduced to $N_2$ and other less harmful or less noxious components using an ammonia oxidation catalyst.

To sufficiently decompose into ammonia, the injected urea must be given adequate time to complete the three stages. The time given to complete the three stages and decompose urea into ammonia before entering the SCR catalyst is conventionally termed residence time. Exhaust aftertreatment systems typically utilize a long tube of a fixed linear decomposition length that is positioned between the urea injector and SCR catalyst inlet face. The tube usually has at its inlet and outlet a respective curved tube such that exhaust gas flows through a curved section of pipe before entering the linear tube and flows through another curved section of pipe after exiting the linear tube.

Often, the reductant (e.g., urea) is injected into the exhaust aftertreatment system upstream of the inlet of the decomposition tube, and more specifically, at or before the first curved section of pipe coupled to the inlet of the decomposition tube. Due to the high velocity and centrifugal force of the exhaust gas flowing through the first curved section of pipe, the injected liquid reductant is carried toward and sticks to the radially outer portion of the inner wall of the first curved tube. A similar condition occurs at the second curved tube where the high velocity and centrifugal force of the exhaust gas drives the partially decomposed urea into the radially outer portion of the inner wall of the second curved tube, which causes the urea to stick to the inner wall. Further, because the temperature and velocity of the exhaust gas is lowest near the inner wall of the exhaust tubing, the decomposition or evaporation of the urea driven into or near the inner wall of the exhaust tubing due to the curved tubes is significantly reduced. Because less of the urea is decomposed into ammonia, the $NO_x$ conversion rate of the SCR catalyst is reduced and the overall efficiency of the SCR system suffers. In addition to lower decomposition rates, curved tube sections tend to reduce the mixing of the urea with the exhaust gas as the urea tends to gravitate together at the inner wall of the bent tubes. Poor urea mixing can lead to a low ammonia vapor uniformity index, which can cause crystallization/polymerization buildup inside the SCR catalyst or other SCR system components, localized aggregation of ammonia, inadequate distribution of the ammonia across the SCR catalyst surface, lower $NO_x$ conversion efficiency, and other shortcomings.

Some exhaust aftertreatment systems attempt to improve urea decomposition and mixing by employing a mixer device that spans the entire interior channel of the tubes. The mixers have a plurality of openings and angled blades through which the exhaust and injected urea flow. Although mixers may have certain benefits, they still fall short of adequately facilitating urea decomposition and mixing. Additionally, known mixers are not only bulky and heavy, but are relatively expensive to manufacture and assemble.

SUMMARY

The subject matter of the present application has been developed in response to the present state of the art, and in particular, in response to the problems and needs in the art that have not yet been fully solved by currently available exhaust aftertreatment systems employing an SCR system. Accordingly, the subject matter of the present application has been developed to provide a reductant decomposition apparatus that overcomes at least some of the shortcomings of prior art reductant decomposition techniques.

According to one embodiment, an apparatus for mounting to an inner wall of an exhaust tube includes a tube engagement surface and an exhaust engagement surface. The tube engagement surface comprises a convex surface of a constant first radius of curvature about a first axis. The exhaust engagement surface is adjacent the tube engagement surface, and includes a concave surface of a second radius of curvature about a second axis generally perpendicular to the first axis.

In some implementations, the apparatus further includes a rounded tip surface extending linearly from a first end of the tube engagement surface to a second end of the tube engagement surface. The exhaust engagement surface extends between the tube engagement surface and the rounded tip surface. In certain implementations, the apparatus has a substantially T-shaped cross-section. According to yet some implementations, the convex surface of the tube engagement surface extends from a first end of the apparatus to a second end of the apparatus, and the exhaust engagement surface terminates at a straight edge of the apparatus that extends from the first end of the apparatus to the second end of the apparatus.

In certain implementations, the first radius of curvature matches a radius of the exhaust tube. An overall height of the apparatus can be between about 10% and 50% of the radius of the exhaust tube. In some implementations, a ratio of the second radius of curvature to an overall height of the apparatus is between about 0.7 and 1.0.

According to some implementations, the apparatus further includes a ledge surface between the tube engagement surface and the exhaust engagement surface. The ledge surface can be substantially planar and extends substantially transversely relative to the tube engagement surface. The ledge surface can have a length that is less than an overall length of the apparatus.

In some implementations, the exhaust engagement surface is a first exhaust engagement surface, and the apparatus further includes a second exhaust engagement surface. The second exhaust engagement surface is adjacent the tube engagement surface and faces a direction generally opposite the first exhaust engagement surface. Further, the second exhaust engagement surface includes a second concave surface of the second radius of curvature.

According to another embodiment, a reductant decomposition system for an exhaust aftertreatment system includes a substantially straight decomposition tube that has an inlet and outlet. The decomposition system also includes a curved tube that has an inlet and an outlet coupled to one of the inlet and outlet of the substantially straight decomposition tube. Additionally, the decomposition system includes a reductant injector port positioned downstream of the inlet of the substantially straight decomposition tube. Further, the decomposition system includes a baffle secured to an inner wall of one of the substantially straight decomposition tube and curved tube. The baffle includes a leading concave surface.

In some implementations of the decomposition system, the baffle further includes a trailing concave surface. The radii of curvature of the leading and trailing concave surfaces can be the same. A radially innermost edge of the baffle can define a chord of the tube to which the baffle is secured. The chord is smaller than an inner diameter of the tube to which the baffle is secured. According to certain implementations, the baffle extends a radial distance into the tube to which the baffle is secured where the radial distance is less than between about 10% and about 50% of an inner radius of the tube to which the baffle is secured.

According to some implementations of the decomposition system, the baffle is secured to the inner wall of the substantially straight decomposition tube, and the curved tube comprises an upstream curved tube. The outlet of the upstream curved tube is coupled to the inlet of the substantially straight tube. The baffle can be positioned a distance away from the outlet of the upstream curved tube where a ratio of the distance to a radius of curvature of the upstream curved tube is between about 0.5 and 1.5. In certain implementations, the ratio of the distance to the radius of curvature of the upstream curved tube is about 0.9. In some implementations, the baffle is positioned between about 200 mm and about 250 mm away from the reductant injector port. In yet some implementations, the baffle is oriented such that the leading concave surface is substantially perpendicular to an exhaust flow direction through the substantially straight decomposition tube. For certain implementations, the baffle is positioned on a portion of the inner wall receiving the highest velocity exhaust gases out of the upstream curved tube. The reductant injector port can be formed in the upstream curved tube.

According to some implementations of the decomposition system, the curved tube is a downstream curved tube with the inlet of the downstream curved tube being coupled to the outlet of the substantially straight tube. The baffle is secured to an inner wall of the downstream curved tube. The baffle can be positioned a distance away from the inlet of the downstream curved tube where a ratio of the distance to a radius of curvature of the downstream curved tube is between about 0.1 and 0.5. In certain implementations, the ratio of the distance to the radius of curvature of the downstream curved tube is about 0.33. According to some implementations, the baffle is oriented such that the leading concave surface is substantially perpendicular to an exhaust flow direction through the substantially straight decomposition tube. The baffle can be positioned on a portion of the inner wall receiving the highest velocity exhaust gases within the downstream curved tube.

In certain implementations of the decomposition system, the baffle is a first baffle secured to an inner wall of the substantially straight decomposition tube. The curved tube is an upstream curved tube with the outlet of the upstream curved tube being coupled to the inlet of the substantially straight tube. The system further includes a downstream curved tube having an inlet coupled to the outlet of the substantially straight tube, and a second baffle secured to an inner wall of the downstream curved tube.

According to some implementations of the decomposition system, the baffle further includes one of a recess and protrusion. The inner wall includes the other of the recess and protrusion. The recess and protrusion are engageable to properly position the baffle relative to the inner wall.

Reference throughout this specification to features, advantages, or similar language does not imply that all of the features and advantages that may be realized with the present invention should be or are in any single embodiment or implementation of the invention. Rather, language referring to the features and advantages is understood to mean that a specific feature, advantage, or characteristic described in connection with an embodiment is included in at least one embodiment of the present invention. Discussion of the features and advantages, and similar language, throughout this specification may, but do not necessarily, refer to the same embodiment or implementation.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

Described herein are various embodiments of an apparatus forming part of an exhaust aftertreatment system having an SCR system. The apparatus facilitates the decomposition and mixing of a reductant (e.g., urea) into ammonia for the conversion of $NO_x$ on an SCR catalyst. In one embodiment, the apparatus is a flow altering device (e.g., baffle) placed within an exhaust gas tube just downstream of a curved section of tubing and a urea injector. The baffle spans just a portion of the interior channel of the tubing. The baffle is specifically configured to disrupt or break the boundary layer of exhaust gas exiting the curved section of tubing near the radially outer periphery of the interior channel of the tubing. The boundary layer is broken by effecting a redirection of the exhaust gas around the baffle, away from the radially outer periphery of the tubing, and into a more centralized location within the tubing. Because the boundary layer at the radially outer periphery is broken, the urea injected into the exhaust gas gravitates away from the inner wall of the tubing to reduce the likelihood of the urea building-up on the inner wall and improve the mixing of the urea with the exhaust gas.

In some embodiments, particularly with exhaust aftertreatment systems with multiple curved tubes, a second apparatus, which can be a baffle, is placed downstream of the inlet of a second curved tube. Like the first apparatus, the second apparatus breaks the boundary layer near the radially outer periphery of the second curved tube to reduce build-up of the urea on the inner wall of the tube and promote mixing of the urea and exhaust gas as it passes through the second curved tube. Generally, the baffle of the first and second apparatus is relatively small, light-weight, and inexpensive to make and assemble. Accordingly, the apparatus of the present disclosure offers clear advantages over exhaust aftertreatment systems that use a mixer near bent sections of tubing or use no mixer at all.

Figure 1:
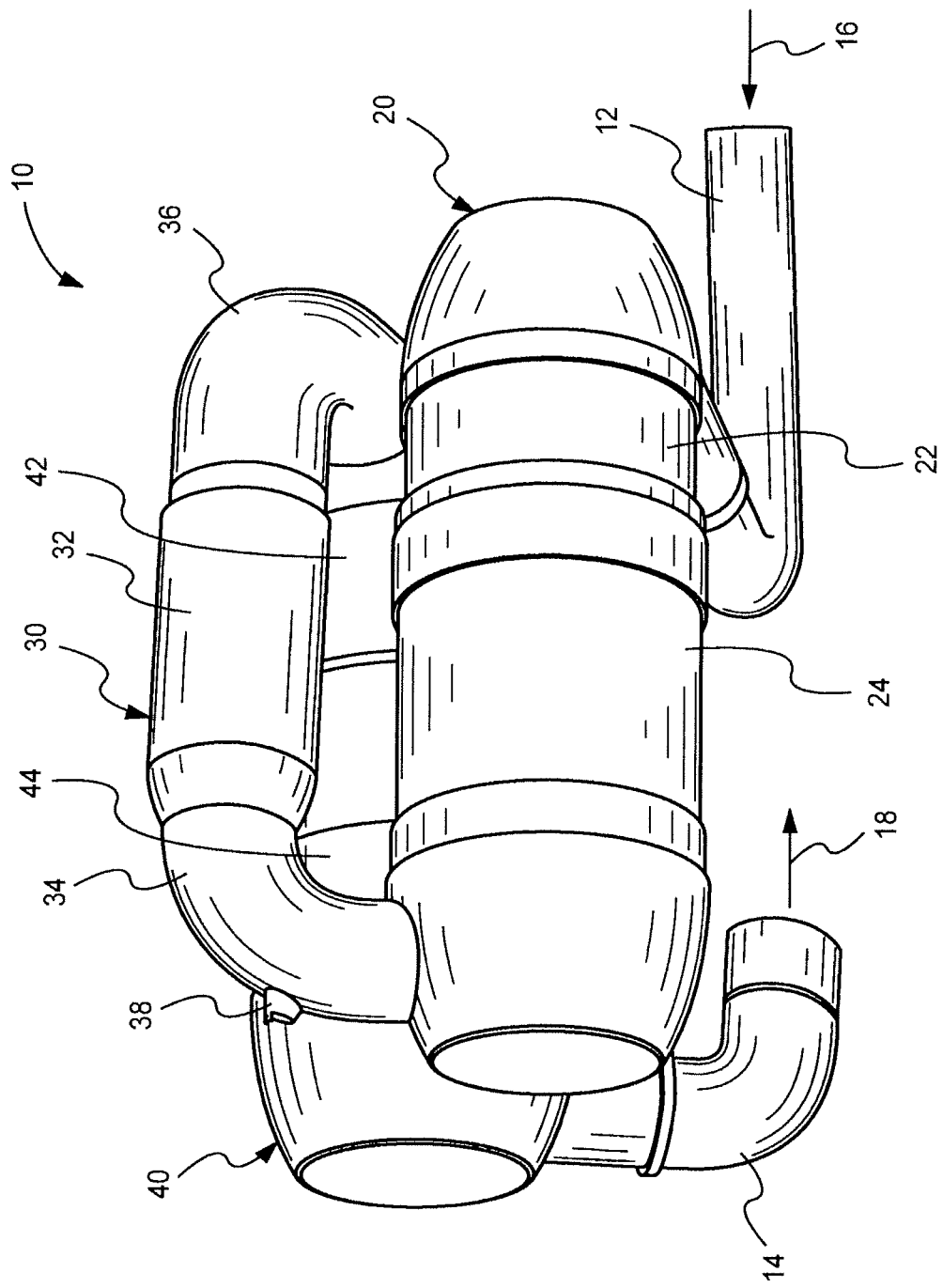
FIG. 1 is a perspective view of an exhaust aftertreatment system according to an embodiment.

In one specific embodiment illustrated in FIG. 1, an exhaust aftertreatment system 10 is coupled to an internal combustion engine (not shown) and capable of receiving and treating exhaust gas generated by the engine. In certain implementations, the exhaust aftertreatment system 10 is secured to a vehicle in which the engine is housed. The system 10 can be secured at any of various locations on the vehicle using any of various fastening techniques and/or fastening devices.

The exhaust aftertreatment system 10 includes a first device section 20, a decomposition section 30, and a second device section 40. The decomposition section 30 couples the second device section 40 in exhaust receiving communication with the first device section 20. The system 10 further includes an inlet pipe 12 and outlet pipe 14. The inlet pipe 12 receives exhaust gas 16 from the engine and directs the exhaust gas into the first device section 20. The outlet pipe 14 receives exhaust gas 18 from the second device section 40 and delivers it to a downstream device (e.g., a muffler and/or tailpipe) before the exhaust gas is expelled into the atmosphere. Exhaust gas 16 entering the system 10 flows in a generally single direction through each of the first device section 20, decomposition section 30, and second device section 40 in order before exiting the system.

The first device section 20 includes one or more housings covering one or more exhaust treatment devices. In one embodiment, the first device section 20 includes a DOC portion 22 and DPF portion 24 downstream of the DOC portion. The DOC portion 22 includes at least one oxidation catalyst covered by an associated housing. The DPF portion 24 includes at least one particulate filter covered by an associated housing. The housings of the DOC and DPF portions 22, 24 may be the same housing or separate housings.

The second device section 40 also includes one or more housings covering one or more exhaust treatment devices. In the illustrated embodiment, the second device section 40 includes an SCR portion 42 and an ammonia oxidation (AMOX) portion 44. The SCR portion 42 includes at least one SCR catalyst covered by an associated housing. Similarly, the AMOX portion 44 includes at least one AMOX catalyst covered by an associated housing.

The decomposition section 20 is positioned between the first and second device sections 20, 40. In the illustrated embodiment, the decomposition section 20 includes a main decomposition tube 32, an upstream curved tube 34, and a downstream curved tube 36 to facilitate a switch-back configuration of the system 10. The system 10 utilizes or requires curved tubes 32, 34 to promote a compact and efficient design. Space on a vehicle is often limited. Accordingly, exhaust aftertreatment systems, such as system 10, must fit in limited spaces and should be as compact as possible. For this reason, the use of curved tubes can be used to redirect a flow of exhaust gas from a first direction to a significantly different direction in relatively tight spaces. Although the decomposition section 20 includes upstream and downstream curved tubes 34, 36, in other embodiments, the decomposition section 20 may include only one of the upstream and downstream curved tubes. In yet other embodiments, the decomposition section 20 may include more curved tubes than the upstream and downstream curved tubes 34, 36.

Further, although the main decomposition tube 32 is a single substantially straight tube, in other embodiments, the main decomposition tube 32 can include multiple tubes and/or include one or more slightly curved tubes.

The decomposition section 20 also includes a reductant injector port 38 for retaining a reductant injector 96, which is coupled to a reductant source (not shown). The reductant injector 96 can be a urea injector configured to inject urea from a urea source into an exhaust gas stream flowing through the system 10. In the illustrated embodiment, the reductant injector port 38 is positioned on the upstream curved tube 34 to secure an injector 96 that injects reductant 39 into the exhaust gas stream 82 as it flows through the upstream curved tube (see FIG. 2). However, in some other embodiments, the reductant injector port 38 can be positioned at any of various locations upstream of the upstream curved tube 34. Regardless, after the reductant 39 is injected into the exhaust gas stream 82, the reductant begins to decompose or evaporate into ammonia and other components and begins to intermix with the exhaust gas. The reductant and exhaust gas mixture 84 passes through the decomposition tube 32 and downstream curved tube 36 before entering the second device section 40. Prior to entering the SCR catalyst of the SCR portion 42, the urea should be adequately decomposed into ammonia and uniformly mixed with the exhaust gas stream to achieve a desirable conversion efficiency of $NO_x$ into less harmful components on the SCR catalyst. If the urea is not adequately decomposed or mixed, then the $NO_x$ conversion efficiency may be undesirably low.

Figure 2:
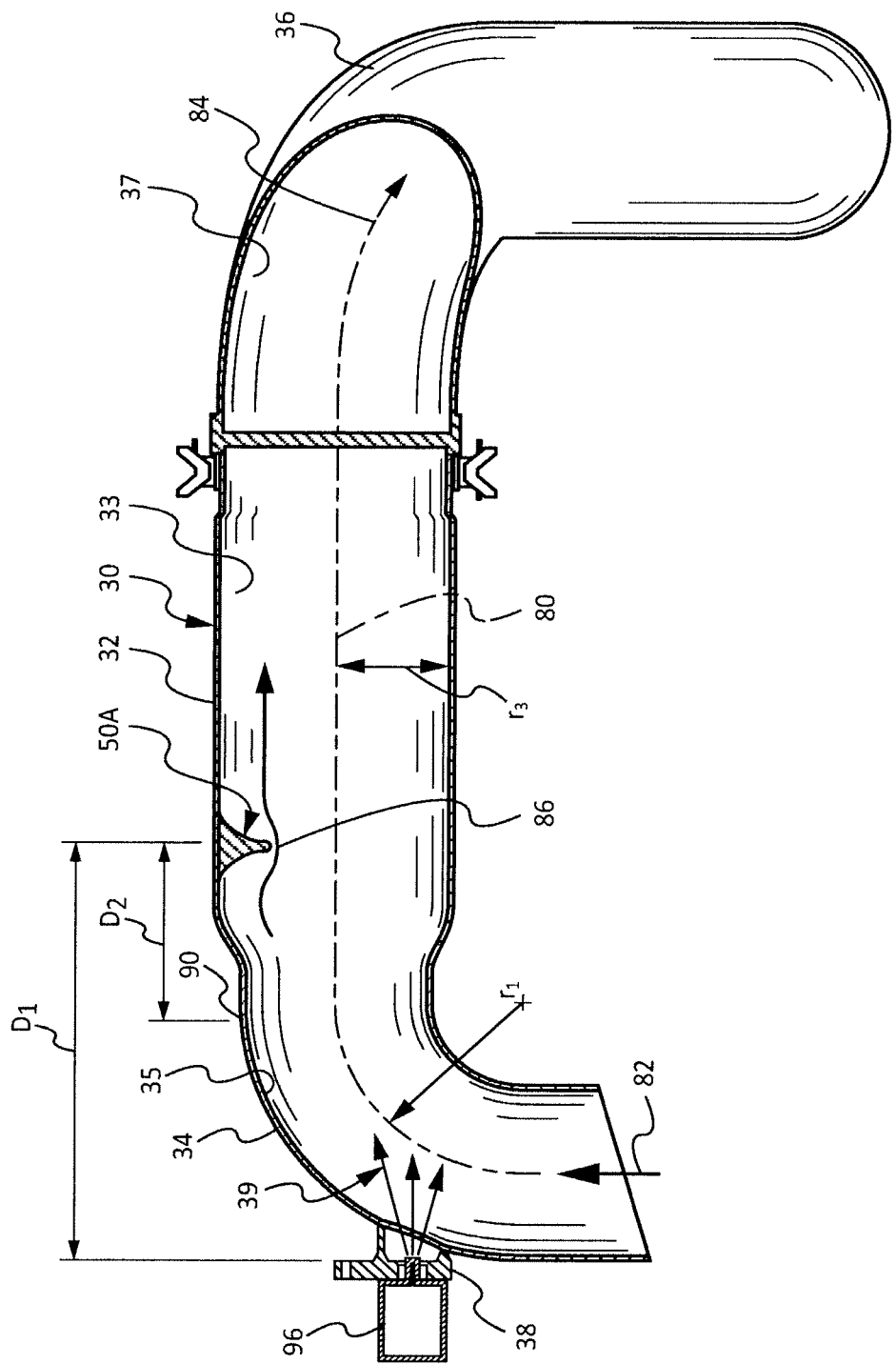
FIG. 2 is a partial cross-sectional side view of a decomposition section of the exhaust aftertreatment system of FIG. 1 according to one embodiment.
Figure 3:
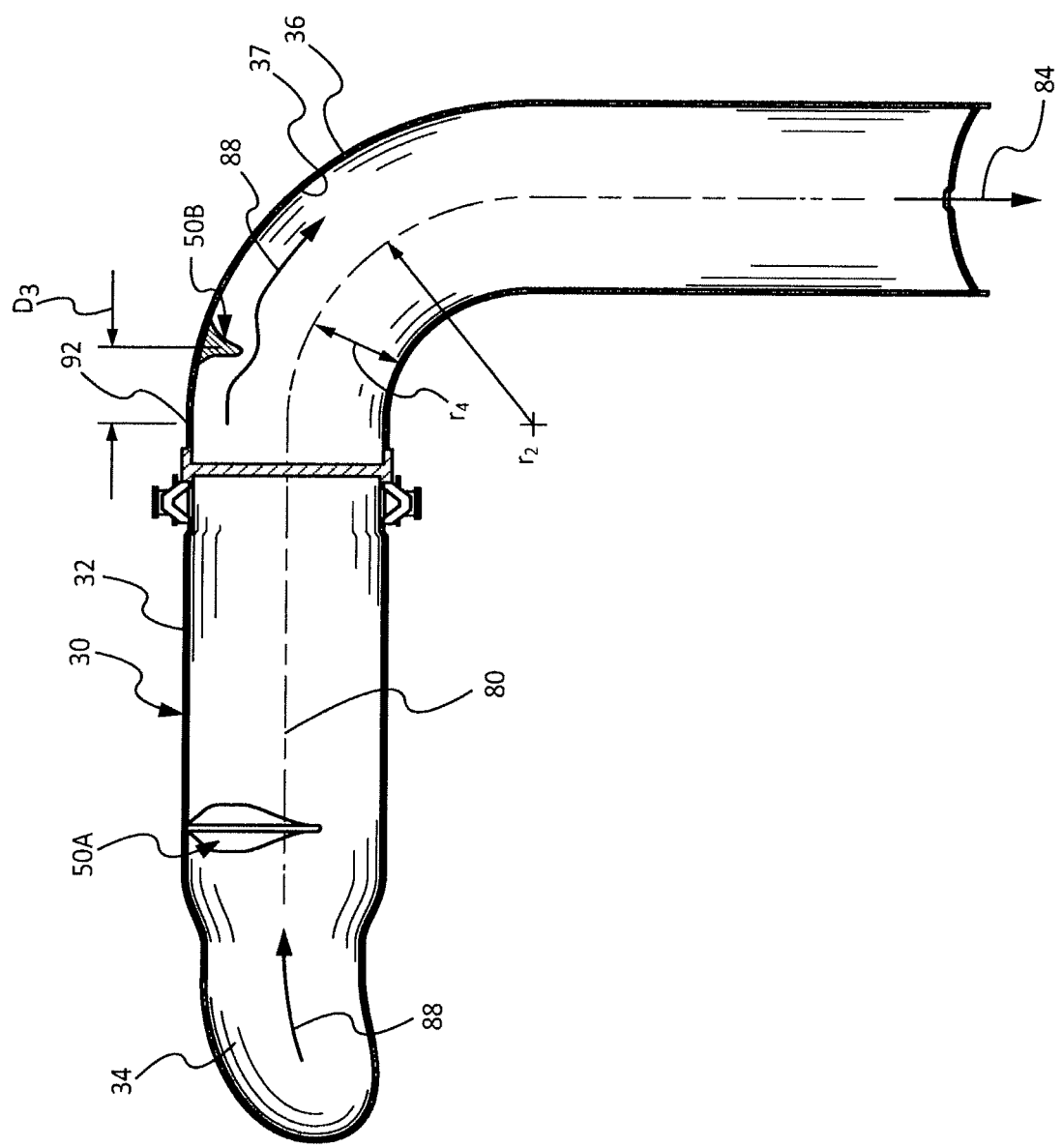
FIG. 3 is a cross-sectional angled view of the decomposition section of the exhaust aftertreatment system of FIG. 1.

Referring to FIG. 2, due to the relatively small radius of curvature $r_1$ of a central axis 80 of the upstream curved tube 34, the combination of the high velocity and centrifugal force of the exhaust gas stream 82 flowing through the upstream curved tube tends to drive the injected urea 39 into an inner wall 35 of the upstream curved tube, as well as an inner wall 33 of the main decomposition tube 32. Generally, the central axis 80 of the decomposition section 30 is parallel to the direction of exhaust flow through the decomposition section. Because the velocity and temperature of the exhaust gas stream 82 near the inner walls 33, 35 is low, some of the urea tends to stick to the inner walls and the remaining urea fails to sufficiently mix with the exhaust gas stream. Referring to FIG. 3, a similar condition may exist as the exhaust and urea mixture 84 exits the main decomposition tube 32 and passes through the downstream curved tube 36. For example, the combination of the high velocity and centrifugal force of the mixture 84 flowing through the downstream curved tube 36 tends to drive the injected urea into an inner wall 37 of the downstream curved tube. Because the velocity and temperature of the mixture 84 near the inner wall 37 is low, some of the urea tends to stick to the inner walls and the remaining urea fails to sufficiently mix with the exhaust gas stream. As used herein, the inner walls of the tubes may also be defined as the inner surfaces of a wall of the tube. Similarly, outer walls of the tubes may also be defined as the outer surfaces of the wall of the tubes. Accordingly, the use herein of inner wall and outer wall of a tube can be interchangeable with inner surface and outer surface, respectively, of a wall of the tube.

It has been found that interrupting or breaking the boundary layer of the urea and exhaust gas mixture along the targeted portions of the inner walls 33, 35, 37 most conducive to urea build-up and mixture degradation, redirects the centrifugally driven mixture away from these portions of the inner walls and towards the central axis 80 of the decomposition section 30. By redirecting the mixture away from the inner walls 33, 35, 37, build-up of urea on the inner walls is reduced and mixing between the urea and exhaust gas stream can be increased. To interrupt or break the boundary layer of the mixture, the decomposition section 30 includes first and second flow altering devices or baffles 50A, 50B. In certain implementations, the first and second baffles 50A, 50B are specifically configured and positioned to interrupt or break the boundary layer of the mixture at the targeted portions of the inner walls 33, 35, 37 without imparting a substantial negative impact on the exhaust backpressure within the system 10. As shown in FIGS. 2 and 3, the exhaust gas and urea mixture being redirected away from the inner walls to break up the boundary layer are depicted as arrows 86, 88, respectively.

As shown in FIG. 2, the first baffle 50A is coupled to the inner wall 33 of the main decomposition tube 32 a first distance $D_1$ away from a nozzle outlet of the reductant injector 38 and a second distance $D_2$ away from an outlet end 90 of the upstream curved tube 34. The outlet end 90 is defined as the point or plane at which the upstream curved tube 34 stops curving. In other words, the outlet end 90 corresponds with the location along the upstream curved tube 34 where a plane extending perpendicular to the central axis 80 of the upstream curved tube is perpendicular to the central axis 80 of the main decomposition tube 32.

The first distance $D_1$ is selected to place the first baffle 50A at a location on the inner wall that is less than a predetermined maximum distance threshold. The maximum distance threshold is associated with a distance at which a significant amount of the injected urea 39 has sufficiently migrated toward the inner to begin to stick to the inner wall. Accordingly, the first baffle 50A should be placed at a location that is less than the distance threshold to redirect the injected urea away from the inner wall and break the boundary layer before a location where urea crystals might begin to build-up on the inner wall. Generally, the predetermined maximum distance threshold is based on the radius of curvature of the upstream curved tube. For example, the bigger the bend radius, the smaller the predetermined maximum distance threshold and vice versa. In some implementations, the predetermined maximum distance threshold, as well as the first distance $D_1$, is between about 200 mm and 250 mm. In one specific implementation, the predetermined maximum distance threshold is approximately 250 mm, and the first distance $D_1$ is about 245 mm.

The second distance $D_2$ is selected to place the first baffle 50A at the targeted portion of the inner wall 33. In certain implementations, the location of the targeted portion on the inner wall 33, and thus the selected second distance $D_2$, is dependent upon the radius of curvature $r_1$ of the upstream curved tube 34. Generally, the larger the radius of curvature $r_1$, the smaller the second distance $D_2$. In contrast, the smaller the radius of curvature $r_1$, the larger the second distance $D_2$. According to some implementations, the second distance $D_2$ is between about 50 mm and about 150 mm, and the radius of curvature $r_1$ is between about 50 mm and about 150 mm. In one specific implementation, the second distance $D_2$ is about 90 mm and the radius of curvature $r_1$ is about 102 mm. Moreover, in certain implementations, the ratio of the second distance $D_2$ to the radius of curvature $r_1$ is between about 0.5 and 1.5. In one specific implementation, the ratio of second distance $D_2$ to the radius of curvature $r_1$ is about 0.9 (e.g., 0.88).

In some implementations, the second distance $D_2$ also is dependent on the velocity of the exhaust stream through the upstream curved tube 34. For example, the higher the velocity of the exhaust gas stream, the larger the second distance $D_2$. In contrast, the lower the velocity of the exhaust gas stream, the smaller the second distance $D_2$. In implementations in which the second distance $D_2$ is dependent upon the velocity of the exhaust gas, the velocity of the exhaust gas stream forming the basis of the determination of the second distance $D_2$ can be a predicted average velocity of the exhaust gas stream based on predicted duty cycles of the engine, predicted usage of the vehicle, and any of various other factors.

Referring to FIG. 3, the second baffle 50B is coupled to the inner wall 37 of the downstream curved tube 36 a third distance $D_3$ away from an inlet end 92 of the downstream curved tube. The inlet end 92 is defined as the point or plane at which the downstream curved tube 36 starts curving. In other words, the inlet end 92 corresponds with the location along the downstream curved tube 36 where a plane extending perpendicular to the central axis 80 of the downstream curved tube is non-perpendicular to the central axis 80 of the main decomposition tube 32. The third distance $D_3$ is selected to place the second baffle 50B at the targeted portion of the inner wall 37. In certain implementations, the location of the targeted portion on the inner wall 37, and thus the selected third distance $D_3$, is dependent upon the radius of curvature $r_2$ of the downstream curved tube 36. Generally, the larger the radius of curvature $r_2$, the larger the third distance $D_3$. In contrast, the smaller the radius of curvature $r_2$, the smaller the third distance $D_3$. According to some implementations, the third distance $D_3$ is between about 25 mm and about 100 mm, and the radius of curvature $r_2$ is between about 100 mm and about 200 mm. In one specific implementation, the third distance $D_3$ is about 50 mm and the radius of curvature $r_2$ is about 152 mm. Moreover, in certain implementations, the ratio of the third distance $D_3$ to the radius of curvature $r_2$ is between about 0.1 and about 0.5. In one specific implementation, the ratio of third distance $D_3$ to the radius of curvature $r_2$ is about 0.33.

In some implementations, the third distance $D_3$ also is dependent on the velocity of the exhaust stream through the downstream curved tube 36. For example, the higher the velocity of the exhaust gas stream, the larger the third distance $D_3$. In contrast, the lower the velocity of the exhaust gas stream, the smaller the third distance $D_3$. Like the second distance $D_2$, in implementations in which the third distance $D_3$ is dependent upon the velocity of the exhaust gas, the velocity of the exhaust gas stream forming the basis of the determination of the third distance $D_3$ can be a predicted average velocity of the exhaust gas stream based on predicted duty cycles of the engine, predicted usage of the vehicle, and any of various other factors.

Figure 6:
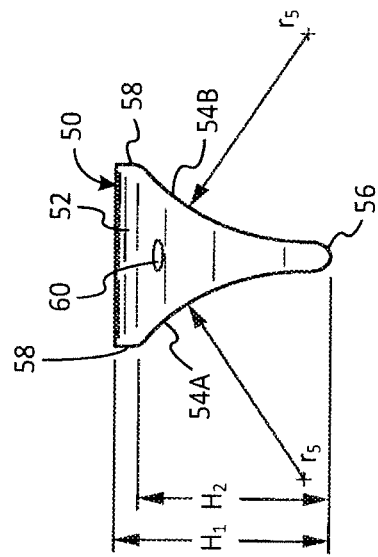
FIG. 6 is a side elevation view of the baffle of FIG. 4.
Figure 5:
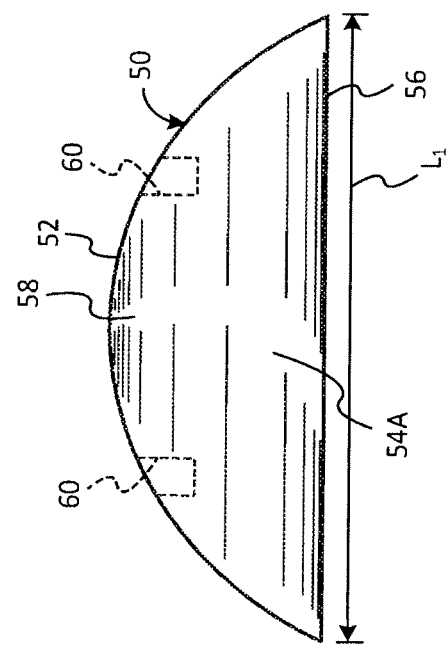
FIG. 5 is a front elevation view of the baffle of FIG. 4.
Figure 4:
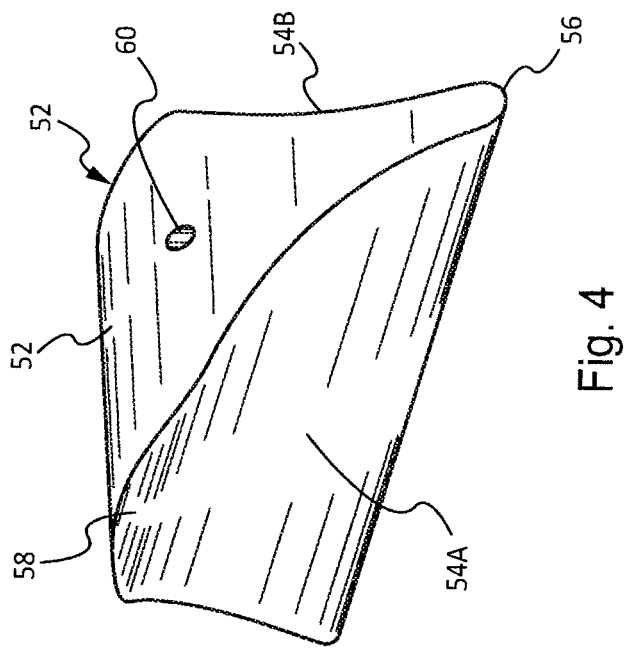
FIG. 4 is a perspective view of a baffle according to one embodiment.

Referring now to FIGS. 4-6, a baffle 50, which is representative of the first and second baffles 50A, 50B, includes a tube engagement surface 52, opposing exhaust flow engagement surfaces 54A, 54B, a rounded tip surface 56, and opposing top ledge surfaces 58. Generally, in the illustrated embodiments, the baffle 50 is substantially semi-circular or semi-ovular shaped when viewed from the front (see FIG. 5) and has a substantially T-shaped profile when viewed from the side (see FIG. 6). The baffle 50 is sized and shaped to break the boundary layer of an exhaust and urea mixture and facilitate relatively smooth flow of the mixture around the baffle without inducing significant amounts of backpressure.

The baffle 50 is configured to be mounted flush to the inner wall of a tube. Accordingly, the tube engagement surface 52 is curved to match the curvature of the inner wall of the tube to which the baffle 50 is to be mounted. In other words, the radius of curvature of the tube engagement surface 52 is equal to the radius of the tube (e.g., radius $r_3$ of tube 32 or radius $r_4$ of tube 36) to which the baffle 50 is mounted if the tube is circular. Accordingly, the curvature (radius of curvature) of the top tube engagement surface is defined about an axis that is coaxial with the axis 80 of the tube when the baffle 50 is secured to the tube. The flush nature of the engagement between the tube engagement surface 52 and inner wall of the tube prevents exhaust gas from passing between the inner wall and the tube engagement surface during operation. For mounting to a substantially straight tube (e.g., tube 32), the tube engagement surface 52 is curved to define curved lines in a lateral direction (see FIG. 5), and the surface defines straight lines in an axial direction (see FIG. 6). However, for mounting flush to a bent tube (e.g., tube 36), the tube engagement surface 52 can be slightly curved in the axial direction to conform to the radius of curvature of the outermost bend in the tube (see, e.g., FIG. 3). As defined herein, the axial direction may correspond with the axis 80 of the system, and the lateral direction may correspond with a direction generally perpendicular to the axis 80.

The tube engagement surface 52 is mounted to the inner wall of the tube using any of various attachment techniques. In one embodiment, the baffle 50 is welded to the inner wall of the tube. In another embodiment, the baffle 50 is fastened to the inner wall of the tube using any of various fasteners. To facilitate proper alignment and positioning of the baffle 50 with respect to the tube, in some embodiments, the baffle includes one or more recesses 60 configured to engage corresponding plugs (not shown) mounted to the inner wall of the tube. Once the plugs are engaged with the recesses 60, the correct position and alignment of the baffle 50 is ensured, and the baffle can then be secured in place using a desirable attachment technique, such as welding. Alternatively, the baffle 50 can include plugs configured to engage recesses or apertures formed in the tube.

In some implementations, the recesses 60 are threaded and configured to receive fasteners that extend from outside the tube through holes formed at locations in the tube corresponding to the desired location and orientation of the baffle 50. The fasteners are tightened to tighten the baffle 50 against the inner wall of the tube. Then, if desired, the baffle 50 can be further secured to the inner wall by welding.

The rounded tip surface 56 extends from one end of the tube engagement surface 52 to the other end. As shown in FIG. 5, the rounded tip surface 56 is substantially straight or non-curved in a longitudinal direction relative to the baffle and substantially curved in a lateral direction relative to the baffle. Accordingly, when the baffle 50 is properly mounted to the inner wall of the tube, the rounded tip surface 56 defines a chord extending between opposing portions of the inner wall. The longitudinal length $L_1$ of the rounded tip surface 56 (and thus the overall length of the baffle 50 or chord defined by the surface 56 of the baffle) is substantially less than an inner diameter of the tube. In other words, the baffle 50 resembles a partial ring that extends only partially about the interior of the tube. Therefore, when mounted to the inner wall of the tube, the baffle 50 occupies a small portion of the cross-sectional area of the tube. In this manner, the baffle 50 blocks only a small portion of exhaust gas flowing through the tube, and thus a significant increase in exhaust backpressure is not induced due to the baffle. In certain implementations, the baffle 50 is configured to block between about 18% and 20% of the exhaust gas flow (i.e., the baffle covers between about 18% and 20% of the cross-sectional area of the tube to which the baffle is attached). Generally, in certain embodiments, the smaller the radius of curvature of the rounded tip surface 56 in the lateral direction, the more effective the baffle 50 is at breaking the boundary layer. In some implementations, the radius of curvature of the rounded tip surface 56 in the lateral direction is about 2.5 mm.

The length $L_1$ of the rounded tip surface 56 is proportional to the overall height $H_1$ of the baffle 50 (see FIG. 6). For example, with the radius of the tube engagement surface 52 held constant, the height $H_1$ of the baffle increases with increasing length $L_1$, and vice versa. Like the length $L_1$ of the round tip surface, the height $H_1$ of the baffle 50 is limited to avoid significant exhaust backpressure increases in the tube. In some implementations, to reduce backpressure concerns, the overall height $H_1$ of the baffle 50 is less than between about 10% and about 50% of the inner radius of the tube (e.g., radius $r_3$ of the main decomposition tube 32 and radius $r_4$ of the downstream curved tube 36). In one specific implementation, the overall height $H_1$ of the baffle 50 is about 43% of the radius of the tube. Based on the foregoing, the overall height $H_1$ of the baffle 50 is largely dependent upon the internal radius of the tube. In some embodiments, the overall height $H_1$ of the baffle 50 is between about 15 mm and about 40 mm. In one specific implementation, the overall height $H_1$ of the baffle 50 is about 27.5 mm.

The opposing exhaust flow engagement surfaces 54A, 54B each define a respective concave surface with a radius of curvature $r_5$. Accordingly, the concave surfaces are curved about an axis (show as a "+" in FIG. 6) that is perpendicular to the central axis 80 of the tube when the baffle 50 is secured to the tube. Although the flow engagement surfaces are curved to define curved lines in the axial direction (see FIG. 6), the surface defines straight lines the lateral direction (see FIG. 5). Each flow engagement surface 54A, 54B extends between the tube engagement surface 52 and the rounded tip surface 56. While the tube engagement surface 52 faces a generally radially outward directions when mounted to the inner surface of a tube, the flow engagement surfaces 54A, 54B each face in generally axial directions substantially perpendicular to the radially outward directions. Put another way, the straight lines defined by the tube engagement surface 52 (defined along the axial direction) are substantially perpendicular to the straight lines defined by the flow engagement surfaces 54A, 54B (defined along the lateral direction). In the illustrated embodiment, the configuration (e.g., the radius of curvature $r_5$) of the exhaust flow engagement surfaces 54A, 54B are the same such that the profile of the baffle 50 is substantially symmetrical. When mounted as shown, the flow engagement surface 54A acts as a leading edge and the flow engagement surface 54B acts as a trailing edge. Of course, the baffle 50 could be installed in a reverse manner such that the flow engagement surfaces acting as the leading edge and trailing edge would be switched. However, although the illustrated baffle 50 includes substantially matching flow engagement surfaces 54A, 54B (i.e., the radius of curvature $r_5$ of the flow engagement surfaces are the same), in other embodiments, only the leading edge of the baffle has the radius $r_5$, with the trailing edge having any of various radii of curvature or being substantially planer (i.e., non-curved).

The radius of curvature $r_5$ of the exhaust flow engagement surfaces 54A, 54B is selected to promote an efficient break of the exhaust and urea mixture boundary layer and redirection of mixture around the baffle and towards the center of the tube. In one embodiment, the radius of curvature $r_5$ is selected independent of the configuration of the tube to which the baffle 50 is attached. In other words, radius of curvature r5 of the surfaces 54A, 54B of the baffle 50 remains constant or the same even for variously sized tubes. In one embodiment, the radius of curvature $r_5$ of the baffle 50 is based on the predicted flow properties of the exhaust gas and urea mixture. In one embodiment, the radius of curvature $r_5$ of at least the surface 54A, 54B acting as the leading surface is between about 20 mm and about 30 mm. In one specific implementation, the radius of curvature $r_5$ is about 24.5 mm. The ratio of the radius of curvature $r_5$ to the overall height $H_1$ of the baffle 50 is, in some implementations, between about 0.7 and about 1.0. In one implementation, the ratio of the radius of curvature $r_5$ to the overall height $H_1$ of the baffle 50 is about 0.89.

The top ledge surfaces 58 extend substantially transversely from an upper portion of the tube engagement surface 52 to adjoin a respective one of the exhaust flow engagement surfaces 54A, 54B. The top ledge surfaces 58 are substantially planar in some embodiments, and slightly curved in other embodiments. Each top ledge surface 58 defines one of a leading and trailing top ledge surface depending on the orientation of the baffle 50 when mounted. The leading top ledge surface aids in breaking the boundary layer of the exhaust gas and urea mixture. The top ledge surfaces 58 have a height equal to a difference between an overall height $H_1$ of the baffle 50 and a height $H_2$ of the exhaust flow engagement surfaces 54A, 54B. In some implementations, the height $H_2$ of the surfaces 54A, 54B is between about 14 mm and about 39 mm, such that the height of the top ledge surfaces can be less than about 1 mm. Accordingly, the ratio of the height of the top ledge surfaces to the overall height $H_1$ of the baffle is between about 0.6 and about 0.25 in some implementations. In one specific implementation, the ratio of the height of the top ledge surfaces to the overall height $H_1$ of the baffle is about 0.55.

The baffle 50 can be made from any of various materials, such as metal, metal alloys, ceramics, composites, and polymers. In some implementations, the baffle 50 is made from stainless steel, and in one particular implementation, the stainless steel is 439 stainless steel.

Discussed above is the benefit of the baffle 50 being manufacturable at a much lower cost. This is at least partially due to the relatively simple shape and relatively small size of the baffle, which makes available manufacturing techniques (e.g., injection molding) that are not conducive to manufacturing conventional exhaust mixers. Further, although the illustrated embodiments include a baffle 50 that is formed separate from the tubes to which the baffle is attached, in some implementations, the baffle can be formed integrally with a respective tube using hydroforming or other similar techniques to form a one-piece monolithic construction with the tube. Also, although not shown, the baffle 50 can form part of an annular ring extending about the entire circumference of the tube to which the baffle is attached. The ring can be substantially thin compared to the baffle. The ring can have an outer periphery that, when combined with the outer periphery of the tube engaging surface 52 of the baffle 50 defines a circumference equal to an outer diameter of the tube. Similarly, the inner periphery of the ring can be flush with the inner wall of the tube with the rounded tip surface 56 forming a chord of the ring.

As mentioned earlier, the baffle 50 is configured to reduce sticking or build-up of reductant on the inner walls of the exhaust tubes. Accordingly, the surface of the baffle, and attachment components (e.g., welds), should be smooth. To provide a smooth surface and reduce sticking of reductant on the baffle 50 itself, in some embodiments, the baffle is coated with a low friction or friction-reducing material, such as Teflon®, Thermolon®, ScanPan® coatings, and Ecolon®. In other embodiments, the outer surface of the baffle can be treated, such as via anodization techniques or buffing techniques, to produce a low-friction surface.

As discussed above, the baffles 50A, 50B are mounted to the inner walls of the respective tubes at a strategic axial location along the tubes. Additionally, the baffles 50A, 50B are mounted to the inner walls of the respective tubes in a strategic angular orientation and circumferential location. In the illustrated embodiments, the baffles 50A, 50B are mounted in a perpendicular angular orientation such that the rounded tip surface 56 (e.g., a chord defined by the surface 56) and the concave curved surfaces 54A, 54B are perpendicular to the axis 80 of the respective tube to which the baffles are mounted or perpendicular to the flow of exhaust gas through the decomposition section 20. The circumferential location of the baffles 50A, 50B on the inner walls of the tubes is dependent on the orientation of the curved tubes. Generally, the baffles are positioned circumferentially on the inner walls such the mid-point of the baffles are aligned with the radially outermost portion of the bend in the corresponding curved tube (e.g., the portion of the curved tube associated with the highest velocity of exhaust gas and urea mixture flowing therethrough). As shown in FIG. 2, the radially outermost portion of the bend in the upstream curved tube 34 is associated with a topmost portion of the tube 34 such that the mid-point of the baffle 50A is at a top of the main decomposition tube 32. Similarly, as shown in FIG. 3, the radially outermost portion of the bend in the downstream curved tube 36 is associated with a topmost portion of the tube 36 such that the mid-point of the baffle 50B is at a top of the downstream curved tube. In this manner, both baffles 50A, 50B are circumferentially located to break the boundary layer of the mixture at the location associated with the highest velocity and most significant boundary layer.

Although the illustrated embodiments show a decomposition section of an exhaust aftertreatment system with two curved tubes between which is positioned a straight main decomposition tube, in other embodiments, the decomposition section may have just one curved tube (e.g., an upstream curved tube or a downstream curved tube). In such embodiments, the decomposition section may include just a single baffle associated with the single curved tube. Further, although the illustrated decomposition section includes two baffles each associated with a respective curved tube, in other embodiments, the decomposition section may only include a single baffle (e.g., only a first baffle (see the description of FIG. 12 below) or only a second baffle (see the description of FIG. 13 below) even if the section includes both an upstream and downstream curved tubes as some advantages still exist when using only a single baffle.

Figure 7:
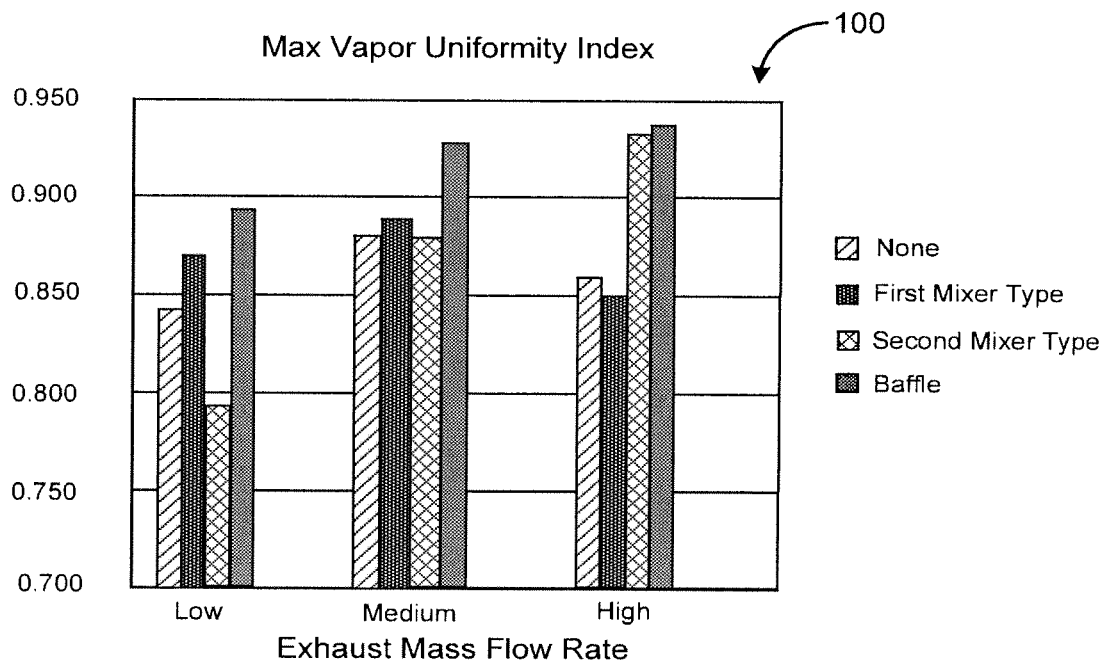
FIG. 7 is a chart comparing maximum vapor uniformity data for various exhaust aftertreatment system configurations at various exhaust mass flow rates obtained using a computational fluid dynamics approach.

The use of at least one baffle, such as one or both of baffles 50A, 50B, in a system as described herein provides significant advantages over prior art systems that do not use flow altering devices, or systems that use various types of mixers. Computational fluid dynamic techniques were utilized to test a switch-back type exhaust aftertreatment system, such as system 10, with various configurations. The first system configuration tested did not include any flow altering device, such as a baffle of the present disclosure or a prior art mixer. The results for the first system configuration are labeled as "None" in FIGS. 7-11. The second system configuration tested included a first mixer type at the outlet of the upstream curved tube. The first mixer type was modeled after prior art mixers characterized by densely packed groups of openings arranged in columns with the openings of each column having matching angled trailing fins. The angle of the trailing fins alternating between alternating columns. The third system configuration tested included a second mixer type at the outlet of the upstream curved tube. The second mixer type was modeled after prior art mixers characterized by groups of openings and associated angled trailing fins similar to the first mixer type, but with fewer and larger openings than the first mixer type. The fourth system configuration tested was modeled after the illustrated system 10 as described above with a first baffle 50A downstream of the outlet of the upstream curved tube and a second baffle 50B downstream of the inlet of the downstream curved tube. The results for the fourth system configuration are labeled as "Baffle" in FIGS. 7-11. Referring to FIG. 7, chart 100 shows the modeled maximum vapor uniformity index, which is a measurement of how well the urea has mixed with the exhaust gas, of the system with the baffles 50A, 50B surpassed the other system configurations at each of three exhaust mass flow rates. The three exhaust mass flow rates includes a low flow rate, medium flow rate, and high flow rate (such as a flow rate associated with regeneration of the system).

Figure 8:
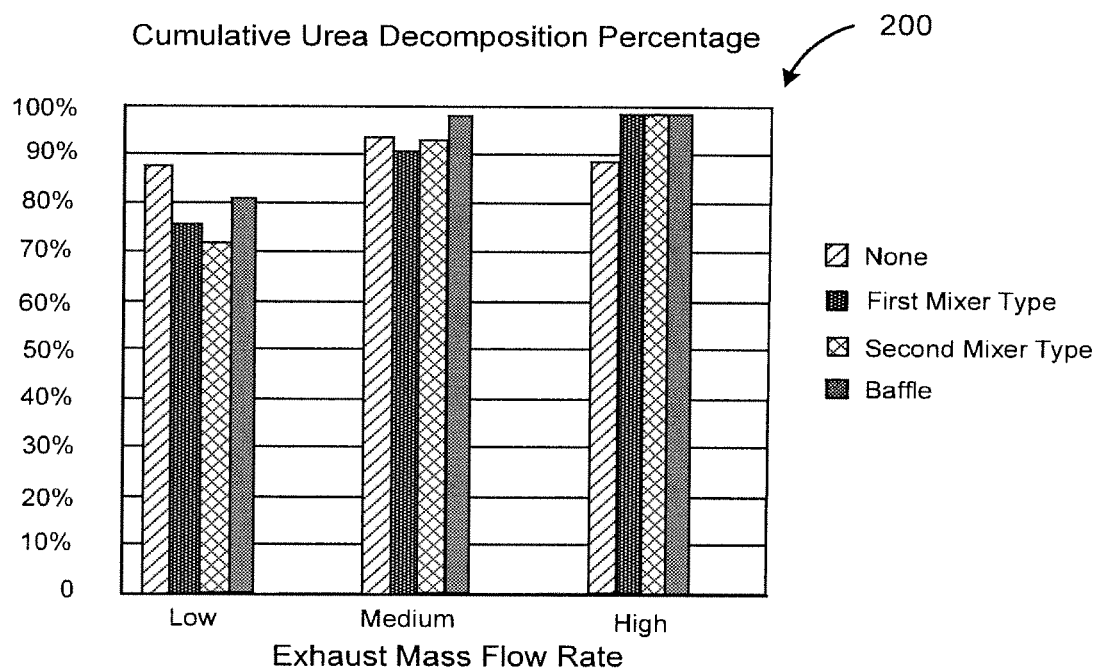
FIG. 8 is a chart comparing cumulative urea decomposition data for various exhaust aftertreatment system configurations at various exhaust mass flow rates obtained using a computational fluid dynamics approach.

Referring to FIG. 8, chart 200 shows the modeled percentage of urea that has properly decomposed for the system with baffles to be higher than, or as high as, the systems with the first and second mixer types for each of the low, medium, and high exhaust mass flow rates.

Figure 9:
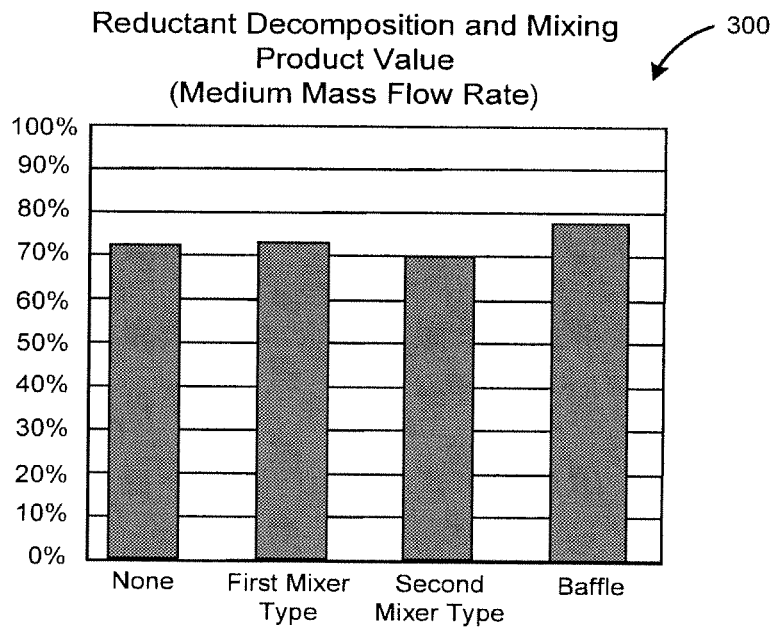
FIG. 9 is a chart comparing reductant decomposition and mixing product data for various exhaust aftertreatment system configurations at a medium exhaust mass flow rate obtained using a computational fluid dynamics approach.

Referring to FIG. 9, chart 300 shows a reductant decomposition and mixing product value at a medium exhaust mass flow rate for the system with baffles to be higher than the system without a flow altering device and the systems with first and second mixer types. The reductant decomposition and mixing product value is equal to the maximum vapor uniformity index (see, e.g., FIG. 7) multiplied by the cumulative reductant decomposition percentage (see, e.g., FIG. 8).

Figure 10:
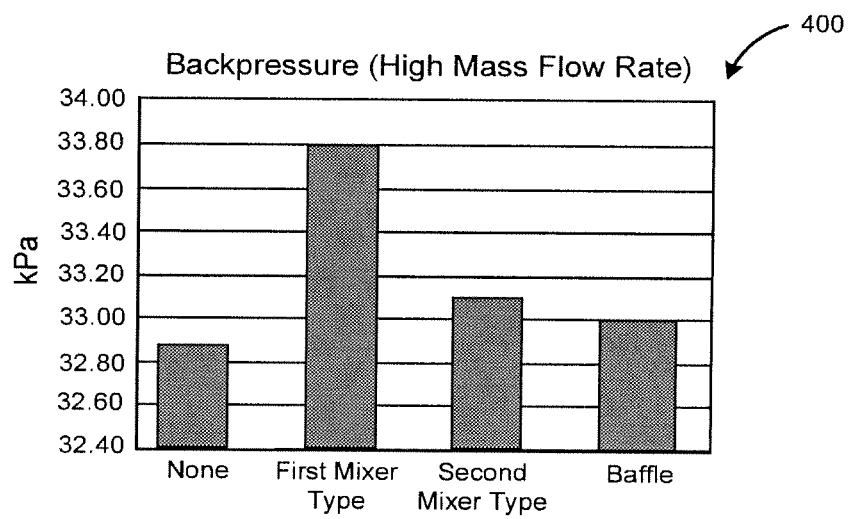
FIG. 10 is a chart comparing exhaust backpressure data for various exhaust aftertreatment system configurations at a high exhaust mass flow rate obtained using a computational fluid dynamics approach.

Referring to FIG. 10, chart 400 shows the modeled exhaust backpressure at a high exhaust mass flow rate for the system with baffles to be lower than the systems with first and second mixer types. Further, as shown, the exhaust backpressure for the baffle system is significantly lower than that of the system with the first mixer type. Additionally, as shown, the exhaust backpressure for the baffle system is only slightly higher than the baseline backpressure, or backpressure of the system without a flow altering device.

Figure 11:
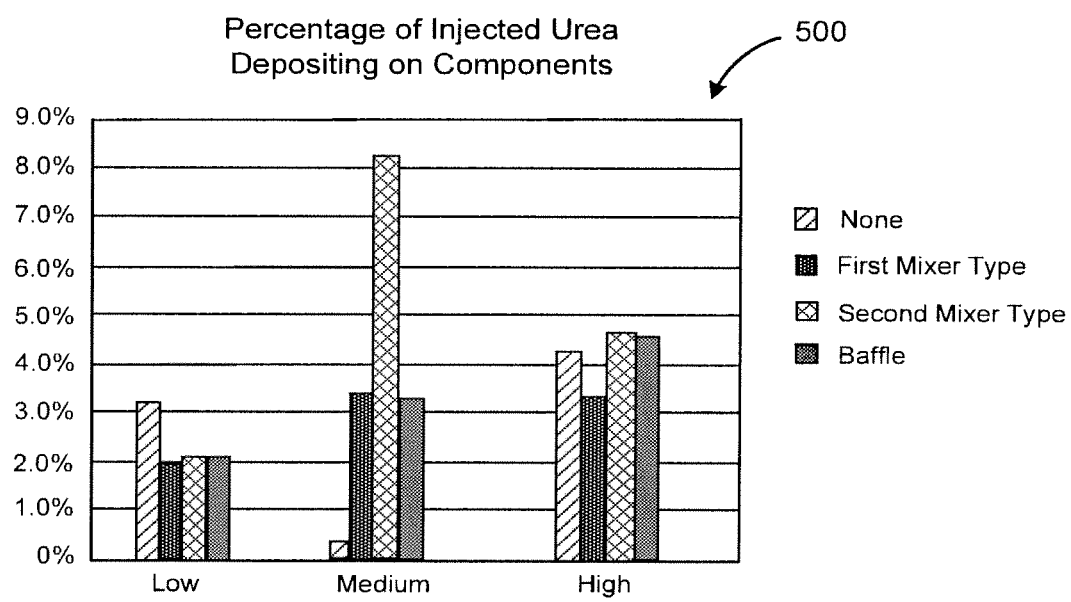
FIG. 11 is a chart comparing injected urea deposition data for various exhaust aftertreatment system configurations at various exhaust mass flow rates obtained using a computational fluid dynamics approach.

Referring to FIG. 11, chart 500 shows the modeled percentage of the injected urea that end up sticking to the walls of the tubes or flow altering devices is lower for the system with baffles compared to the systems with mixers for medium exhaust mass flow rates, and the same as or slightly higher than the systems with mixers for low and high exhaust mass flow rates.

Figure 12:
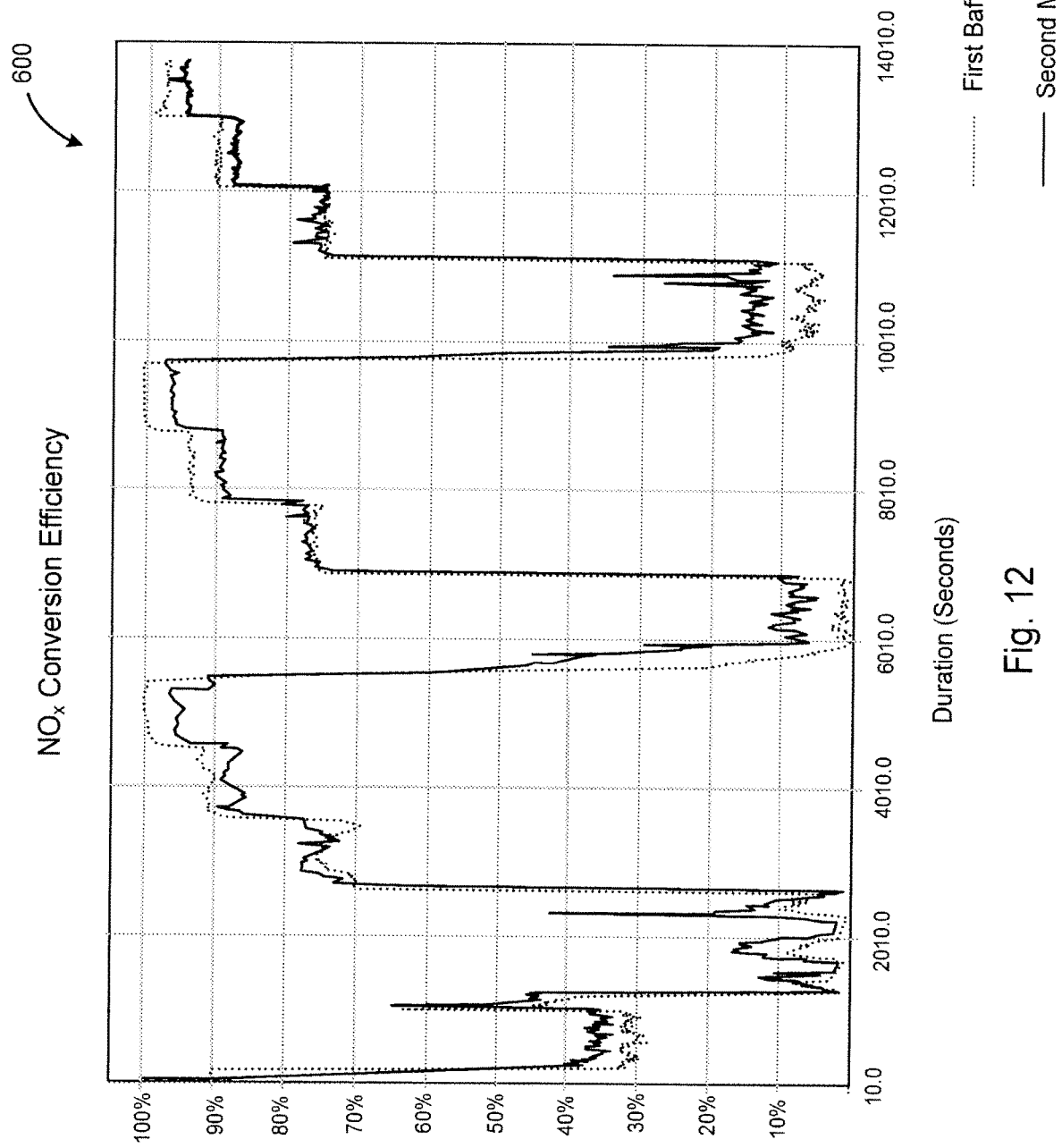
FIG. 12 is a chart comparing actual $NO_x$ conversion efficiency data for two exhaust aftertreatment system configurations at steady state operating conditions obtained using practical test approaches.

Referring to FIG. 12, chart 600 shows the measured percentage of $NO_x$ converted (e.g., $NO_x$ conversion efficiency) of a system with only a first baffle 50A to be generally higher than a system with only a second mixer type at the first baffle location. Similarly, FIG. 13 includes a chart 700 that shows the measured percentage of NO, converted of a system with only a second baffle 50B to be generally higher than a system with only a second mixer type at the second baffle location. The operating conditions for the practical test from which the results shown in charts 600 and 700 were obtained included steady state emissions operating conditions.

Figure 14:
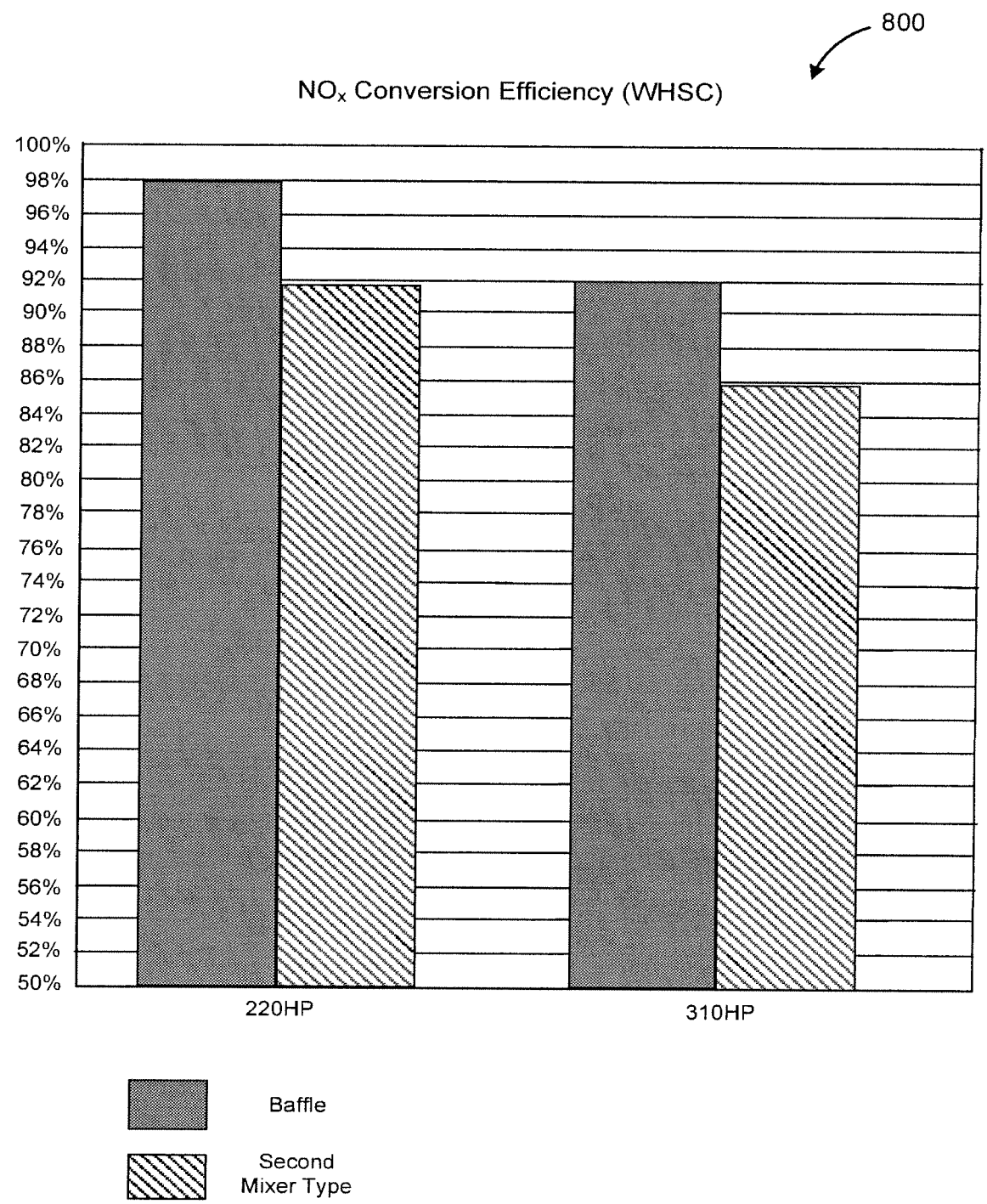
FIG. 14 is a chart comparing actual $NO_x$ conversion efficiency data for two exhaust aftertreatment system configurations obtained during a World Harmonized Stationary Cycle (WHSC) test.
Figure 15:
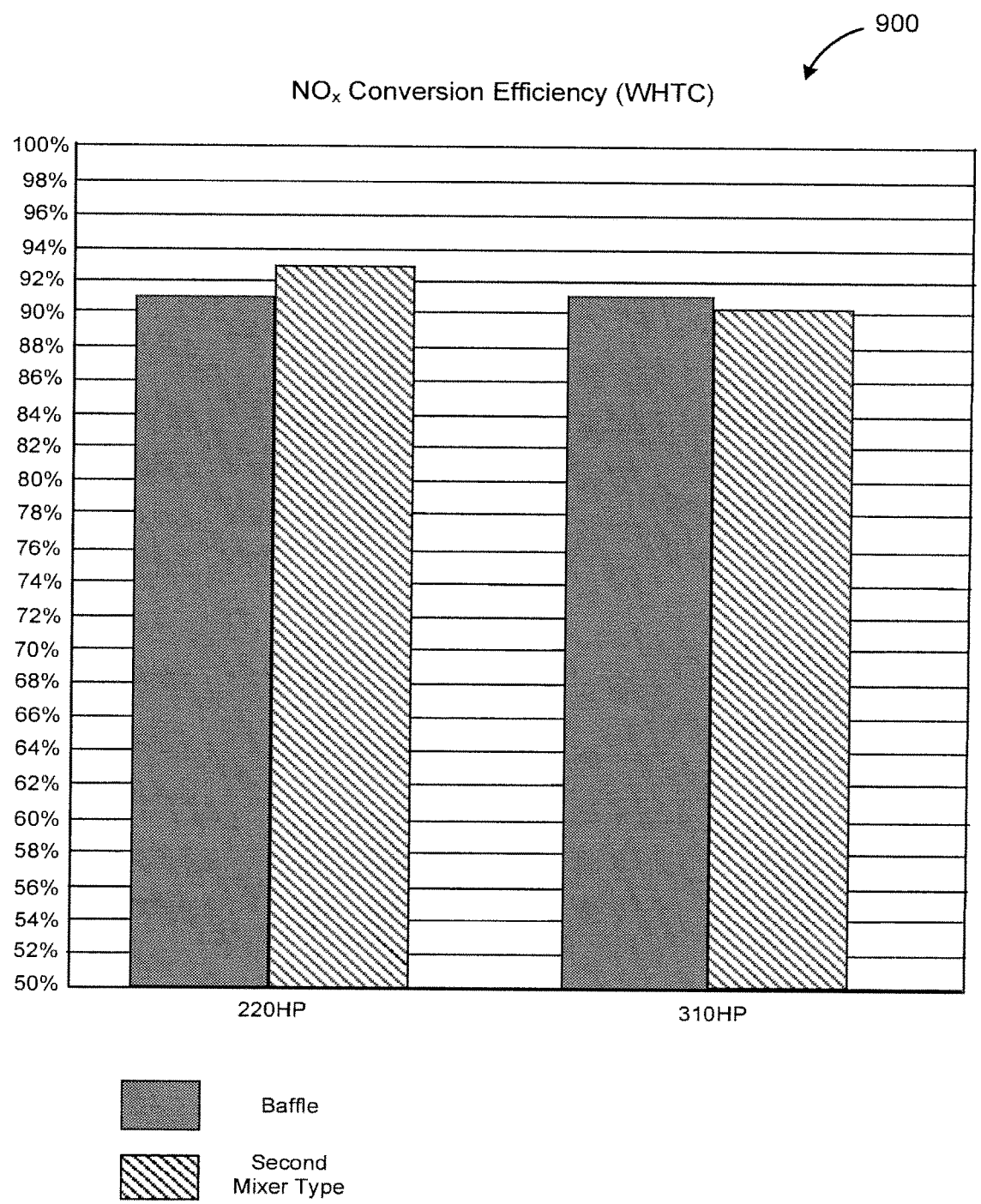
FIG. 15 is a chart comparing actual $NO_x$ conversion efficiency data for the same exhaust aftertreatment system configurations of FIG. 14 obtained during a World Harmonized Transient Cycle (WHTC) test.

Referring to FIG. 14, chart 800 shows the $NO_x$ conversion efficiency measured during a WHSC test on a system configured according to the system 10 of the present application and a system including a mixer of the second type for two engine with different ratings (i.e., a 220 horsepower rated engine and a 310 horsepower rated engine). Clearly, the $NO_x$ conversion efficiency of the baffle system was higher for both engine ratings compared to the system with the second mixer type. Similarly, referring to FIG. 15, chart 900 shows the $NO_x$ conversion efficiency measured during a WHTC test on the system configured according to the system 10 of the present application and the system including the mixer of the second type for the same two differently-rated engines. Generally, during transient cycles, the $NO_x$ conversion efficiency of the baffle system for both engine ratings was about the same as the system with the second mixer type. The slight differences in efficiency indicated in chart 900 was likely due to run-to-run and part-to-part variations associated with multiple testing cycles.

Figure 13:
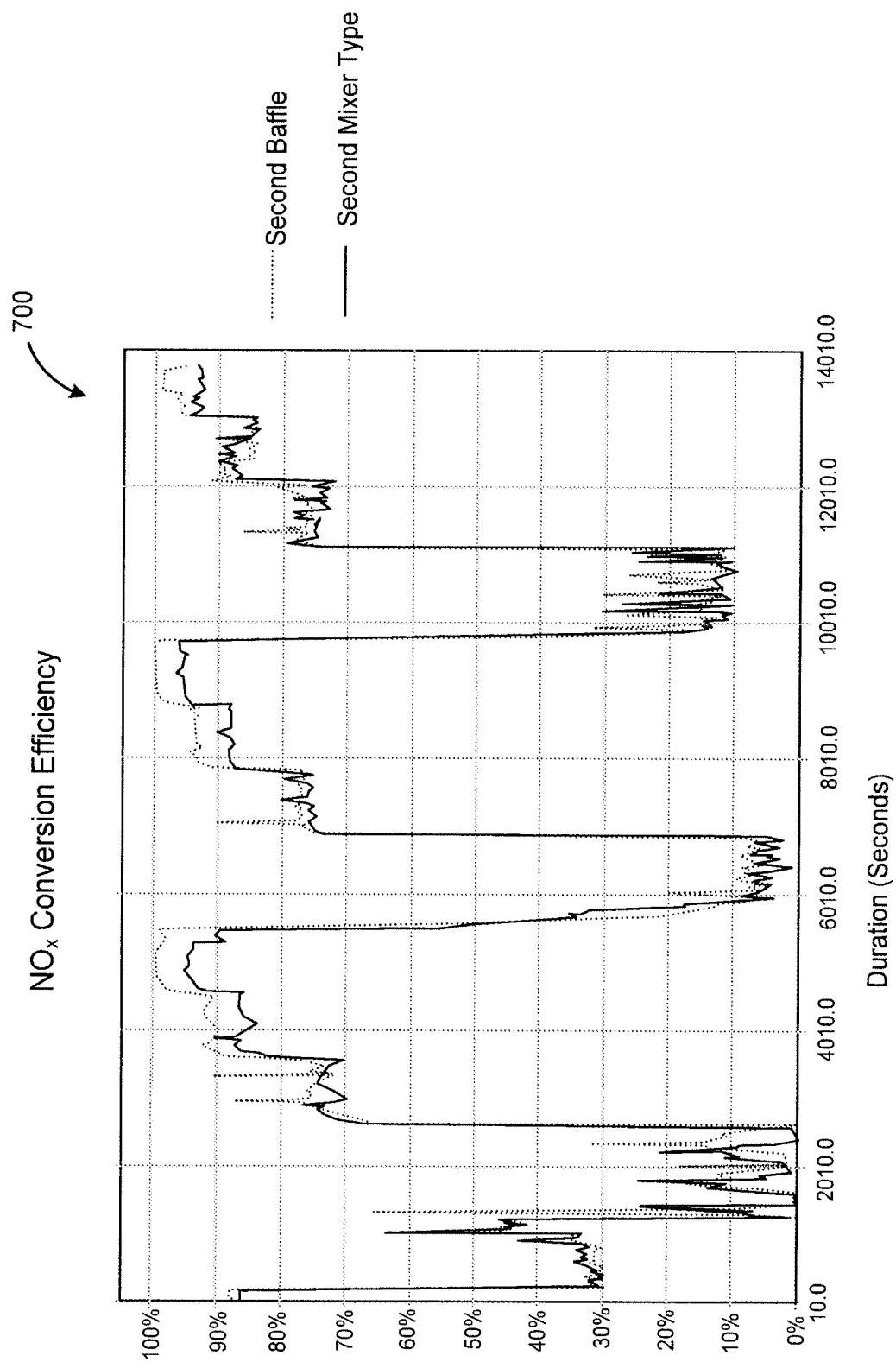
FIG. 13 is a chart comparing actual $NO_x$ conversion efficiency data for two exhaust aftertreatment system configurations at steady state operating conditions obtained using practical test approaches.

Based on the foregoing modeled and measured results, overall, the system of the present disclosure with first and second baffles for breaking the boundary layer associated with two curved tubes provides distinct advantages over the systems without a flow altering device, or with different types of mixers. As shown in FIGS. 12 and 13, one distinct advantage is an increase in the $NO_x$ conversion rate of the SCR system. Moreover, because the $NO_x$ conversion rate achieved the SCR system increases, the SCR system is capable of converting an additional input of $NO_x$ from the engine while still meeting exhaust emissions standards. The flexibility to generate additional $NO_x$ out of the engine allows can lead to an overall increase in the fuel efficiency of the engine.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A baffle for an exhaust tube, the baffle comprising:
a tube engagement surface comprising a convex surface with a first radius of curvature about a first axis;
a first exhaust engagement surface contiguous with the tube engagement surface, the first exhaust engagement surface comprising a first concave surface with a second radius of curvature about a second axis perpendicular to the first axis;
a second exhaust engagement surface contiguous with the tube engagement surface, the second exhaust engagement surface comprising a second concave surface with a third radius of curvature about a third axis perpendicular to the first axis and parallel to the second axis; and
a tip surface contiguous with the tube engagement surface, the first exhaust engagement surface, and the second exhaust engagement surface.

2. The baffle of claim 1, wherein the tip surface extends linearly from a first end of the tube engagement surface to a second end of the tube engagement surface, the first exhaust engagement surface extending between the tube engagement surface and the tip surface.

3. The baffle of claim 1, wherein the baffle has a T-shaped cross-section.

4. The baffle of claim 1, wherein the first radius of curvature matches a radius of the exhaust tube.

5. The baffle of claim 4, wherein an overall height of the baffle is between 10% and 50% of the radius of the exhaust tube.

6. The baffle of claim 1, further comprising a ledge surface between the tube engagement surface and the first exhaust engagement surface, the ledge surface being planar and extending transversely relative to the tube engagement surface;
   wherein the ledge surface has a length that is less than an overall length of the baffle.

7. The baffle of claim 1, wherein a ratio of the second radius of curvature to an overall height of the baffle is between 0.7 and 1.0.

8. The baffle of claim 1, wherein:
   the convex surface of the tube engagement surface extends from a first end of the baffle to a second end of the baffle; and
   the first exhaust engagement surface terminates at a straight edge of the baffle that extends from the first end of the baffle to the second end of the baffle.

9. The baffle of claim 1, wherein the convex surface defines a chord of an inner wall of the exhaust tube when the baffle is mounted to the inner wall, the chord being smaller than a diameter of the inner wall.

10. The baffle of claim 1, wherein the tube engagement surface further comprises a recess configured to receive a protrusion of an inner wall of the exhaust tube when the baffle is mounted to the inner wall.

11. The baffle of claim 1, wherein:
   the first exhaust engagement surface is defined by a length; and
   the length is less than a diameter of the exhaust tube.

12. The baffle of claim 1, wherein the first exhaust engagement surface is symmetrical about a plane bisecting the convex surface and the first exhaust engagement surface.

13. The baffle of claim 12, wherein the convex surface is symmetrical about the plane.

14. The baffle of claim 1, wherein:
   the first exhaust engagement surface has a first profile when viewed along a plane that is parallel to the first axis and perpendicular to the second axis;
   the second exhaust engagement surface has a second profile when viewed along the plane; and
   the first profile is a reflection of the second profile.

15. The baffle of claim 1, wherein:
   the baffle is defined by an overall height measured along the third axis; and
   the overall height is between 15 mm and 40 mm.

16. The baffle of claim 1, wherein the second radius of curvature is between 20 mm and 30 mm.

* * * * *